(12) United States Patent
Pezeshki et al.

(10) Patent No.: US 11,665,566 B2
(45) Date of Patent: May 30, 2023

(54) EVENT TRIGGERED REFERENCE SIGNAL TRANSMISSION

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 16/947,070

(22) Filed: Jul. 16, 2020

(65) Prior Publication Data

US 2021/0044390 A1 Feb. 11, 2021

Related U.S. Application Data

(60) Provisional application No. 62/885,138, filed on Aug. 9, 2019.

(51) Int. Cl.
| | | |
|---|---|---|
| *H04W 24/10* | (2009.01) | |
| *H04L 1/1829* | (2023.01) | |
| *H04L 5/00* | (2006.01) | |
| *H04W 72/0453* | (2023.01) | |
| *H04W 72/044* | (2023.01) | |
| *H04W 72/04* | (2023.01) | |
| *H04W 76/28* | (2018.01) | |

(Continued)

(52) U.S. Cl.
CPC .......... *H04W 24/10* (2013.01); *H04B 17/318* (2015.01); *H04B 17/336* (2015.01); *H04L 1/1858* (2013.01); *H04L 5/0051* (2013.01); *H04L 5/0055* (2013.01); *H04L 5/0098* (2013.01); *H04W 72/042* (2013.01); *H04W 72/046* (2013.01); *H04W 72/0453* (2013.01); *H04W 76/28* (2018.02)

(58) Field of Classification Search
CPC ..................................................... H04W 24/10
See application file for complete search history.

(56) References Cited

U.S. PATENT DOCUMENTS

| | | | |
|---|---|---|---|
| 9,144,082 B2* | 9/2015 | Rubin | H04L 1/0026 |
| 2011/0268028 A1* | 11/2011 | Stern-Berkowitz | H04L 5/0048 370/328 |
| 2016/0294531 A1* | 10/2016 | Loehr | H04W 72/0413 |

(Continued)

OTHER PUBLICATIONS

International Search Report and Written Opinion—PCT/US2020/070294—ISA/EPO—dated Oct. 12, 2020.

*Primary Examiner* — Jason E Mattis
(74) *Attorney, Agent, or Firm* — Harrity & Harrity, LLP

(57) ABSTRACT

Various aspects of the present disclosure generally relate to wireless communication. In some aspects, a base station (BS) may configure, before transmitting a physical downlink shared channel communication, a first resource and a second resource. The BS may transmit the physical downlink shared channel communication using the first resource. The BS may selectively use, after transmitting the physical downlink shared channel communication, the second resource for the reference signal transmission for subband selection and beam selection based at least in part on whether a retransmission event is detected. Numerous other aspects are provided.

30 Claims, 9 Drawing Sheets

(51) Int. Cl.
   *H04B 17/336*   (2015.01)
   *H04B 17/318*   (2015.01)

(56) References Cited

U.S. PATENT DOCUMENTS

| | | | | |
|---|---|---|---|---|
| 2017/0302419 A1* | 10/2017 | Liu | .................... | H04L 5/0082 |
| 2019/0215117 A1 | 7/2019 | Lee et al. | | |
| 2019/0306875 A1* | 10/2019 | Zhou | .................... | H04B 17/327 |
| 2021/0167821 A1* | 6/2021 | Chen | .................... | H04B 7/0404 |
| 2022/0217590 A1* | 7/2022 | Guo | .................. | H04W 36/0072 |

\* cited by examiner

EVENT TRIGGERED REFERENCE SIGNAL TRANSMISSION

CROSS-REFERENCE TO RELATED APPLICATION

This Patent Application claims priority to U.S. Provisional Patent Application No. 62/885,138, filed on Aug. 9, 2019, entitled "EVENT TRIGGERED REFERENCE SIGNAL TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for event triggered reference signal transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include configuring, before transmitting a physical downlink shared channel communication, a first resource and a second resource, wherein the first resource is for the physical downlink shared channel communication in a current subband and the second resource is for a reference signal transmission; transmitting the physical downlink shared channel communication using the first resource; and selectively using, after transmitting the physical downlink shared channel communication, the second resource for the reference signal transmission for subband selection and beam selection based at least in part on whether a retransmission event is detected.

In some aspects, a BS for wireless communication may include memory and one or more processors coupled with the memory. The memory and the one or more processors may be configured to configure, before transmitting a physical downlink shared channel communication, a first resource and a second resource, wherein the first resource is for the physical downlink shared channel communication in a current subband and the second resource is for a reference signal transmission; transmit the physical downlink shared channel communication using the first resource; and selectively use, after transmitting the physical downlink shared channel communication, the second resource for the reference signal transmission for subband selection and beam selection based at least in part on whether a retransmission event is detected.

In some aspects, a non-transitory computer-readable medium may store one or more instructions for wireless communication. The one or more instructions, when executed by one or more processors of a BS, may cause the one or more processors to configure, before transmitting a physical downlink shared channel communication, a first resource and a second resource, wherein the first resource is for the physical downlink shared channel communication in a current subband and the second resource is for a reference signal transmission; transmit the physical downlink shared channel communication using the first resource; and selectively use, after transmitting the physical downlink shared channel communication, the second resource for the reference signal transmission for subband selection and beam selection based at least in part on whether a retransmission event is detected.

In some aspects, an apparatus for wireless communication may include means for configuring, before transmitting a physical downlink shared channel communication, a first resource and a second resource, wherein the first resource is for the physical downlink shared channel communication in a current subband and the second resource is for a reference signal transmission; means for transmitting the physical downlink shared channel communication using the first resource; and means for selectively using, after transmitting the physical downlink shared channel communication, the second resource for the reference signal transmission for subband selection and beam selection based at least in part on whether a retransmission event is detected.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
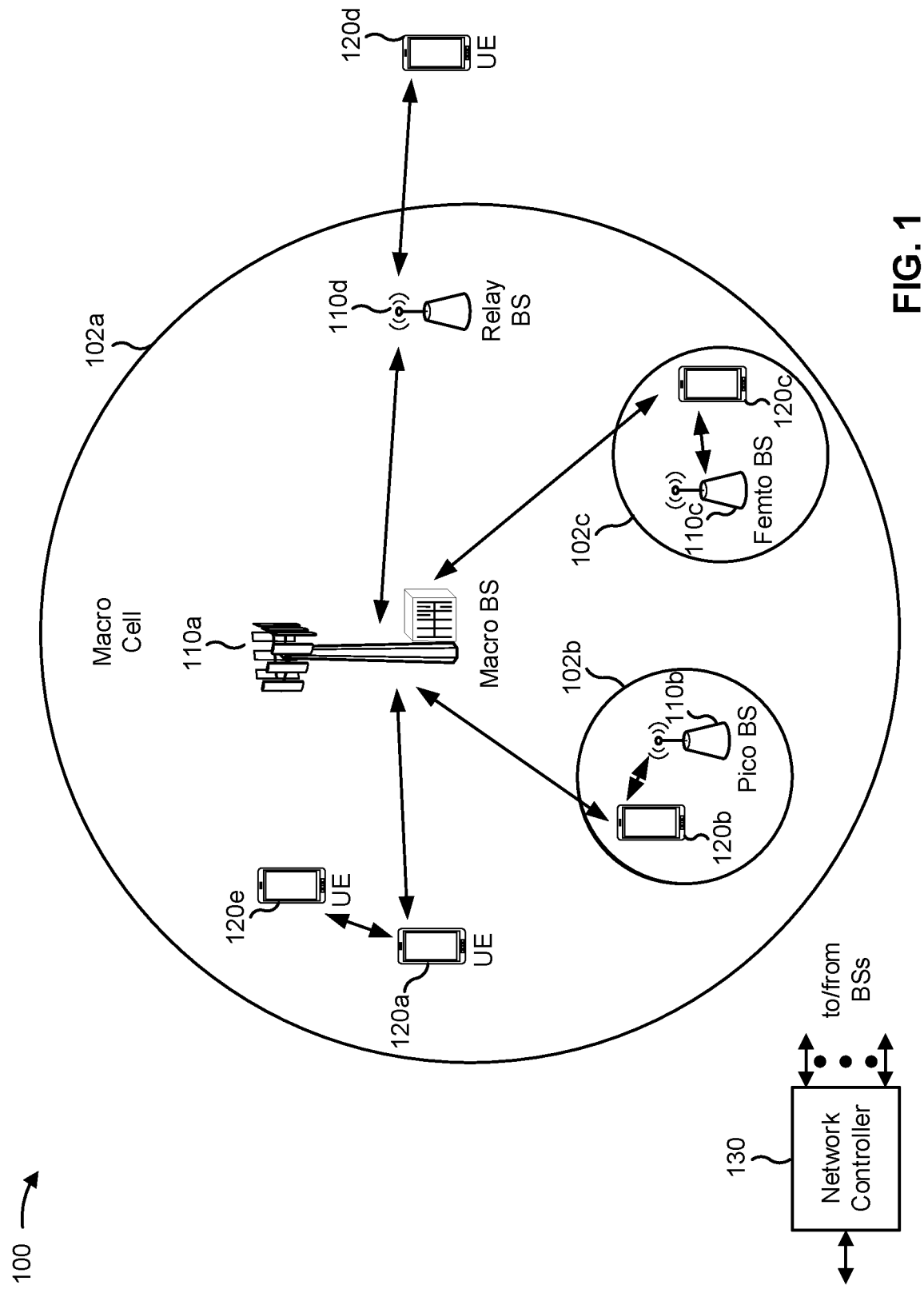
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
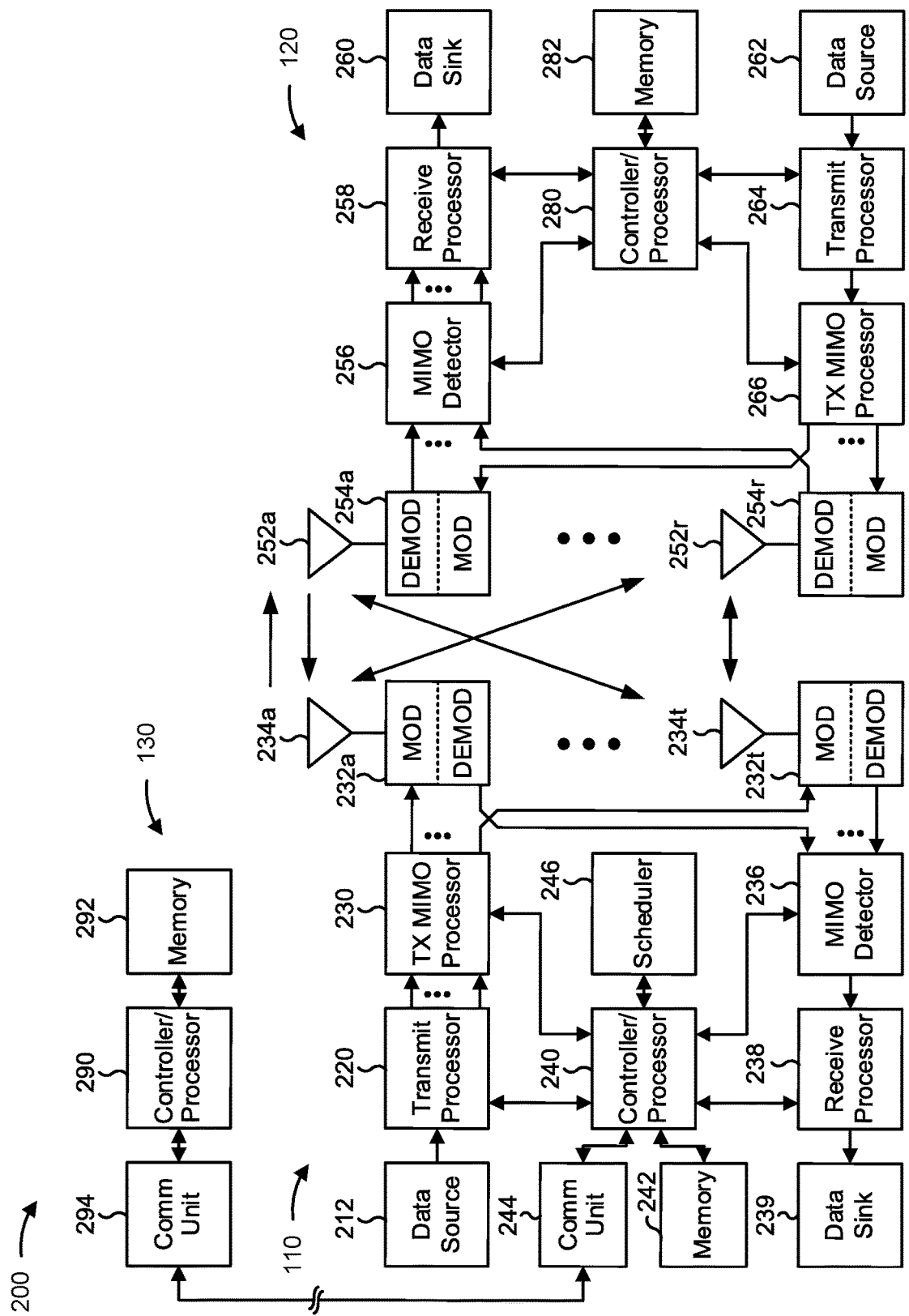
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with event triggered reference signal transmission, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, base station 110 may include means for configuring, before transmitting a physical downlink shared channel communication, a first resource and a second resource, means for transmitting the physical downlink shared channel communication using the first resource, means for selectively using, after transmitting the physical downlink shared channel communication, the second resource for the reference signal transmission for subband selection and beam selection based at least in part on whether a retransmission event is detected, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communication systems, a BS may be deployed with a plurality of panels including a plurality of antennas. The BS may use the plurality of panels and the plurality of antennas for multi-panel frequency division multiplexing (FDM) transmission operations. In some cases, the BS may also perform analog beamforming-based multi-user, multiple input, multiple output (MU-MIMO) operations when performing multi-panel FDM transmission. In this way, the BS may concurrently communicate with a plurality of UEs across a plurality of subbands.

The BS may use a semi-persistent scheduling pattern for the UEs when performing analog beamforming-based MU-MIMO with multi-panel FDM transmissions. However, when a quality of a current subband upon which the BS is scheduling transmissions degrades, semi-persistent scheduling-based initial transmissions may fail, which may trigger retransmissions in new subbands. Collision candidates for the initial transmissions may be different than collision candidates for the retransmissions. As a result, a static configuration may not provide flexibility to schedule retransmissions using a beam and/or subband that avoids a collision and increases a likelihood of success of the retransmission relative to the initial transmission.

Some aspects described herein enable event-triggered reference signal transmissions for subband and beam selection. For example, a BS may detect a failure of an initial transmission, and may use a preconfigured resource in a different subband for a reference signal transmission to identify a resource for a retransmission. In this way, the BS ensures that the retransmission may be dynamically configured based at least in part on results of the reference signal transmission. Moreover, if the failure of the initial transmission does not occur, the BS may make the preconfigured resource available for other transmissions, thereby reducing a utilization of network resources. In this way, the BS may reduce a likelihood of failed retransmissions when performing analog beamforming-based MU-MIMO with multi-panel FDM transmissions, thereby improving network performance and reducing network resource utilization associated with subsequent retransmissions.

FIGS. 3A-3D are diagrams illustrating examples 300-303 of event triggered reference signal transmission, in accordance with various aspects of the present disclosure. For example, as shown in FIGS. 3A-3D, examples 300-303 may include a BS 110 and one or more UEs 120.

Figure 3A:
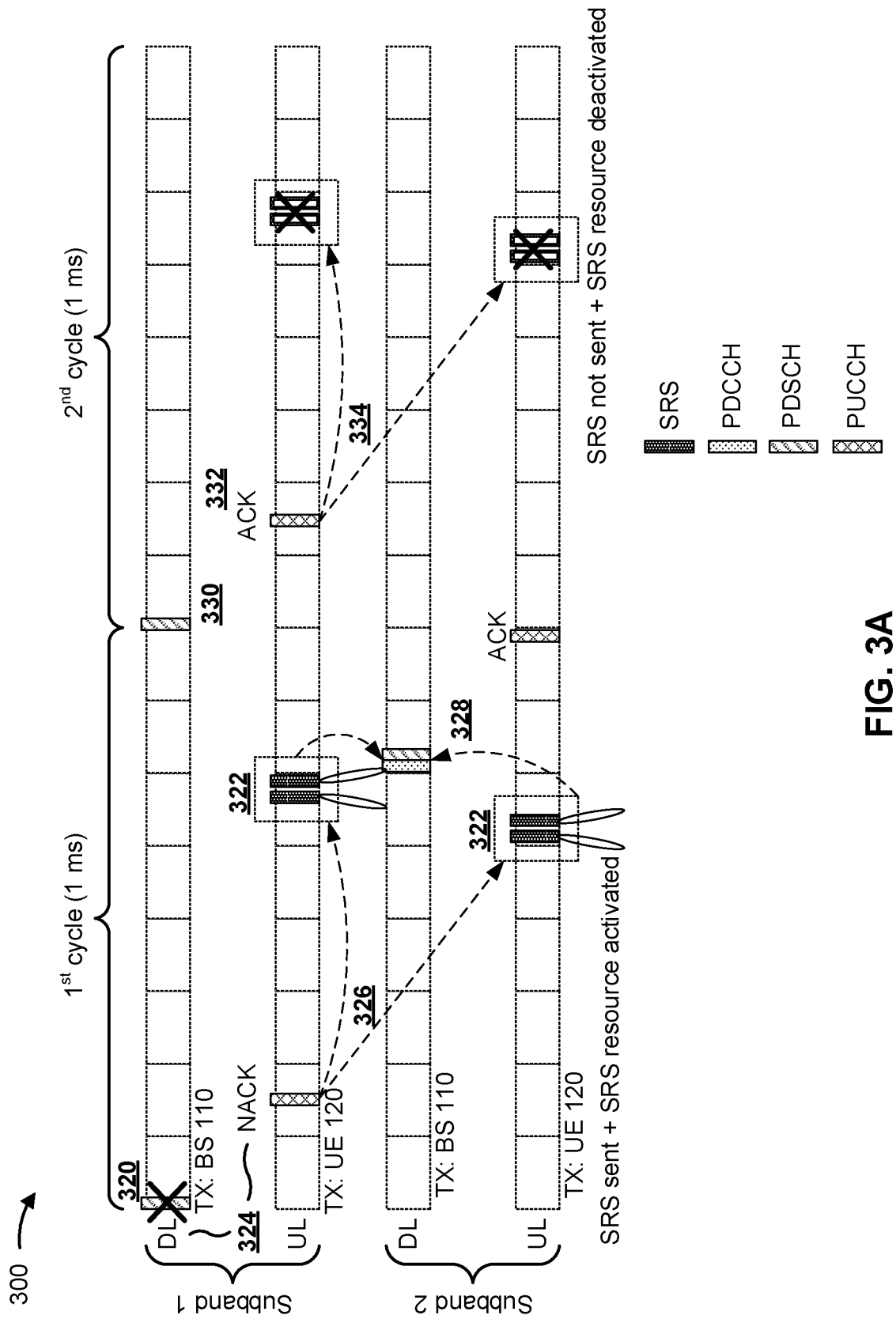
FIGS. 3A-3D are diagrams illustrating examples of event triggered reference signal transmission, in accordance with various aspects of the present disclosure.

As shown in FIG. 3A, and in example 300, in a first transmission cycle (e.g., with a particular length, such as 1 millisecond (ms)), BS 110 may configure a resource 320 for a physical downlink shared channel (PDSCH) on a first subband and a resource 322 for a reference signal transmission on the first subband and/or on a second subband. As shown by reference number 324, BS 110 may transmit a PDSCH transmission and may receive, from UE 120, a negative acknowledgement (NACK) feedback message. In this case, based at least in part on receiving the NACK feedback message, BS 110 may determine that a retransmission event has occurred.

As further shown in FIG. 3A, and by reference number 326, based at least in part on determining that a retransmission event has occurred, BS 110 may use resource 322 for a reference signal transmission. For example, BS 110 may receive a sounding reference signal (SRS) on a particular subband. In this case, BS 110 may use the SRS to select a subband (e.g., the first subband or the second subband) and/or a beam for a retransmission of the PDSCH. In this way, by using the NACK feedback message to trigger reference signal transmission, BS 110 reduces overhead relative to using downlink control information (DCI) and a scheduling offset to enable reference signal transmission.

In some aspects, BS 110 may activate resource 322 based at least in part on determining that the retransmission event has occurred. For example, BS 110 may indicate, to UE 120, that UE 120 is to transmit a reference signal and that resource 322 is reserved and not to be used for other transmissions. In some aspects, BS 110 may receive the reference signal on the first subband, to enable BS 110 to identify a better beam (e.g., than a beam used for an initial PDSCH transmission) for a PDSCH retransmission on the first subband. In this case, the better beam may be determined based at least in part on, for example, a reference signal received power (RSRP), a reference signal received quality (RSRQ), a signal to interference and noise ratio (SINR), and/or the like relative to a current beam for the initial PDSCH transmission. In some aspects, BS 110 may receive the reference signal on the second subband to enable BS 110 to identify a better beam and/or a better subband (e.g., relative to the first subband and in terms of RSRP, RSRQ, SINR, and/or the like of beams of the second subband) for a PDSCH retransmission. In some aspects, BS 110 may receive reference signals on both the first subband and the second subband. In some aspects, BS 110 may receive reference signals on one or more other subbands.

As further shown in FIG. 3A, and by reference number 328, based at least in part on receiving reference signals on the first subband and the second subband, BS 110 may select a beam of the second subband for the retransmission. Based at least in part on selecting the beam of the second subband, BS 110 may transmit a physical downlink control channel (PDCCH) and an associated retransmission of the PDSCH on the second subband.

As further shown in FIG. 3A, in a second transmission cycle, BS 110 may preconfigure resources for another PDSCH transmission and another reference signal transmission. As shown by reference numbers 330, 332, and 334, BS 110 may successfully transmit the PDSCH, receive an acknowledgement (ACK) feedback message, and may determine not to use preconfigured resources for a reference signal transmission. In this case, BS 110 may, for example, transmit an indication that a reference signal transmission is not to occur. In this way, BS 110 may reduce a utilization of network resources, reduce interference, and/or the like relative to receiving a reference signal in the second transmission cycle in accordance with a static configuration.

Figure 3B:
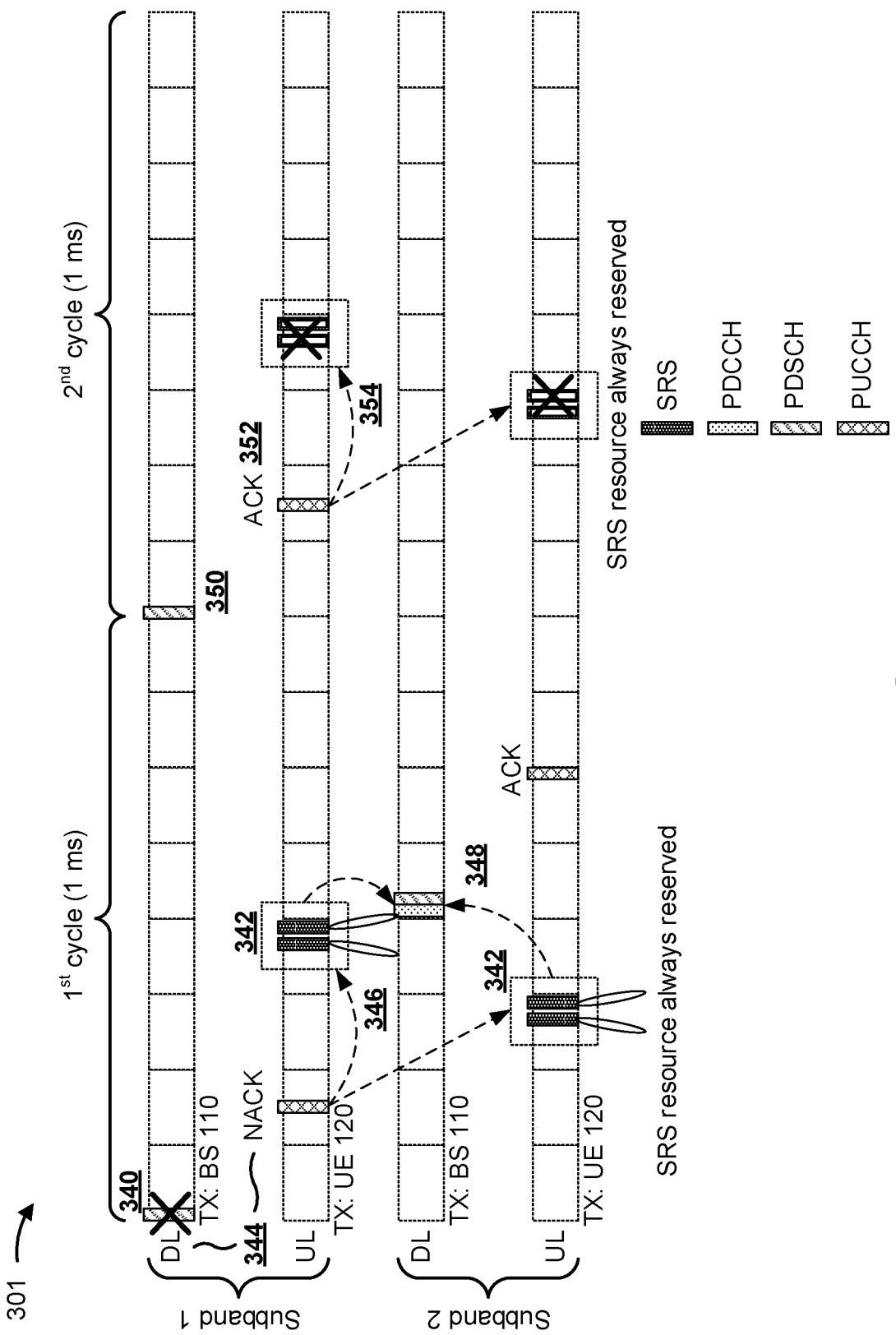

As shown in FIG. 3B, in example 301, and in a first transmission cycle, BS 110 may preconfigure resources 340 and 342 that are statically reserved for a PDSCH transmission and a reference signal transmission. For example, rather than preconfiguring a reference signal resource that is dynamically activated by a NACK feedback message as in example 300, BS 110 may preconfigure a resource 342 that is statically activated but triggered by receipt of a NACK feedback message. In this way, an offset between a resource in which the NACK feedback message is to be received and an occurrence of a reference signal resource may be reduced relative to a dynamically activated reference signal resource.

As further shown in FIG. 3B, and by reference numbers 344 and 346, BS 110 may transmit a PDSCH in resource 340, and may receive a NACK feedback message from UE 120 indicating a transmission failure. Additionally, or alternatively, BS 110 may determine the transmission failure based at least in part on another indicator. For example, BS 110 may receive a discontinuous transmission (DTX) of an SRS using resource 342, which may indicate an ACK feedback message, and may determine that a transmission success has occurred. In contrast, when BS 110 receives a continuous transmission of the SRS using resource 342, BS 110 may determine that a transmission failure has occurred. In this way, BS 110 uses a statically configured reference signal resource to reduce network utilization, relative to using an explicit ACK feedback message or NACK feedback message.

As further shown in FIG. 3B, and by reference number 348, BS 110 may use received SRSs in the first subband and the second subband to select a beam and/or subband for a retransmission of the PDSCH and may retransmit the PDSCH. For example, BS 110 may transmit a PDCCH and an associated retransmission of the PDSCH in the second subband.

As further shown in FIG. 3B, in a second transmission cycle, BS 110 may configure a first resource for transmitting a PDSCH and a second resource for a reference signal transmission. In this case, as shown by reference numbers 350 and 352, BS 110 may transmit the PDSCH and receive an ACK feedback message from UE 120 indicating a successful transmission of the PDSCH. As a result, as shown by reference number 354, BS 110 may forgo receiving a reference signal using resource 352, thereby reducing interference relative to receiving the reference signal when the PDSCH transmission is already completed.

Figure 3C:
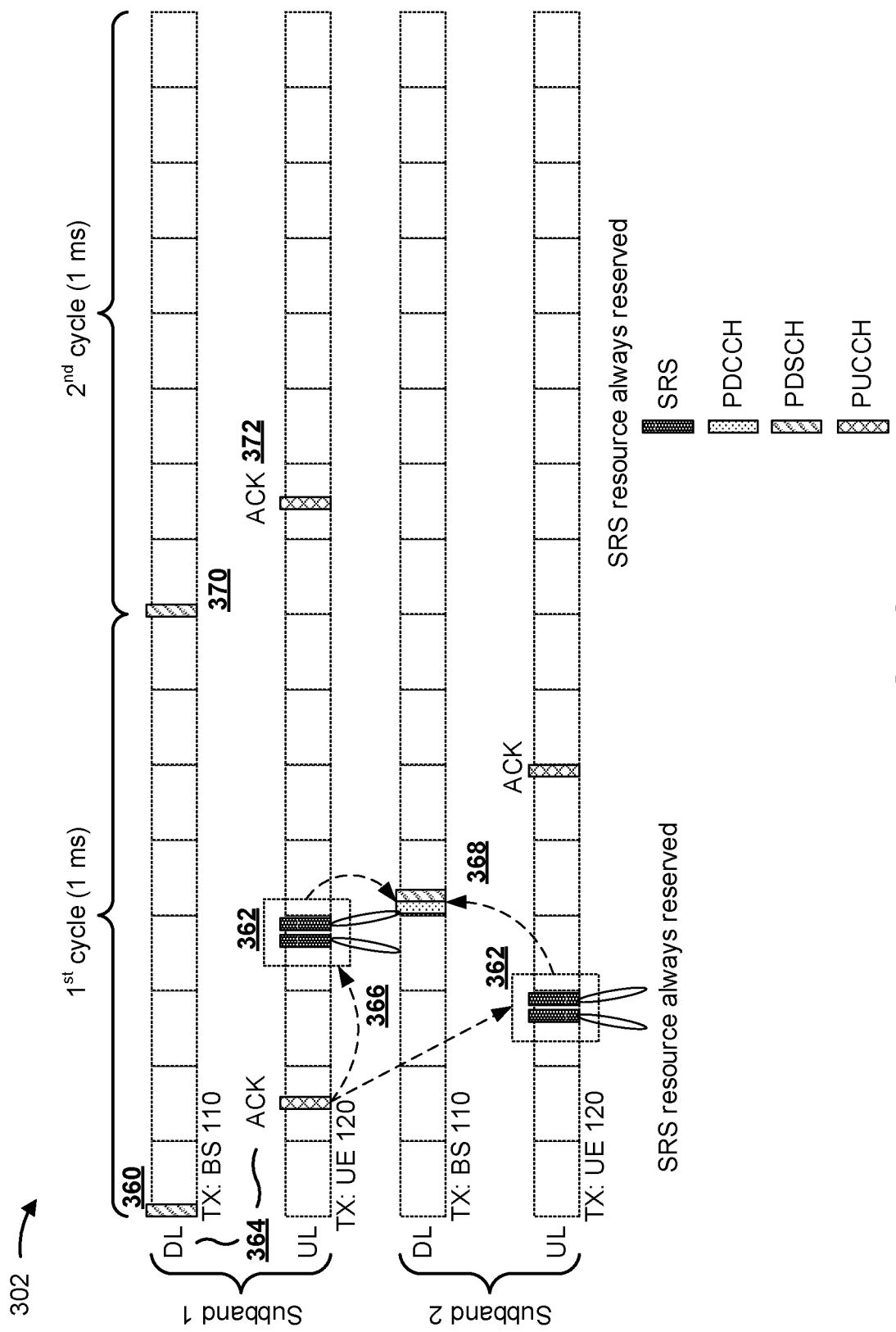

As shown in FIG. 3C, in example 302, and in a first transmission cycle, BS 110 may preconfigure resources 360 and 362 that are reserved for a PDSCH transmission and a reference signal transmission. In this case, BS 110 may preconfigure a resource 362 that is statically activated but triggered by occurrence of another type of event rather than by receipt of a NACK feedback message. For example, BS 110 may preconfigure resource 362 for an SRS transmission when a component carrier channel quality metric is below a measurement threshold. In this case, as shown by reference numbers 364 and 366, BS 110 may transmit a PDSCH in resource 360, and may receive an ACK feedback message from UE 120 indicating a transmission success. However, BS 110 and/or UE 120 may determine, based at least in part on the ACK feedback message, that a retransmission event is detected based at least in part on an RSRP, an RSRQ, an SINR, a log-likelihood ratio (LLR), and/or the like of the PDSCH and/or the ACK feedback message being below a threshold value.

As further shown in FIG. 3C, and by reference number 346, BS 110 may use resource 362 to receive reference signals (e.g., SRSs) in the first subband and the second subband to select a beam and/or subband for a retransmission of the PDSCH. As shown by reference number 368, based at least in part on the reference signals, BS 110 may transmit a PDCCH and an associated retransmission of the PDSCH in the second subband.

As further shown in FIG. 3C, in a second transmission cycle, BS 110 may configure a first resource for transmitting a PDSCH and a second resource for a reference signal transmission. As shown by reference numbers 370 and 372, BS 110 may transmit the PDSCH and receive an ACK feedback message from UE 120 indicating a successful transmission of the PDSCH. In this case, based at least in part on receiving the ACK feedback message, BS 110 may determine that a retransmission event has not occurred (e.g., a measurement is greater than or equal to a measurement threshold), and may forgo reference signal transmission and retransmission of the PDSCH.

Figure 3D:
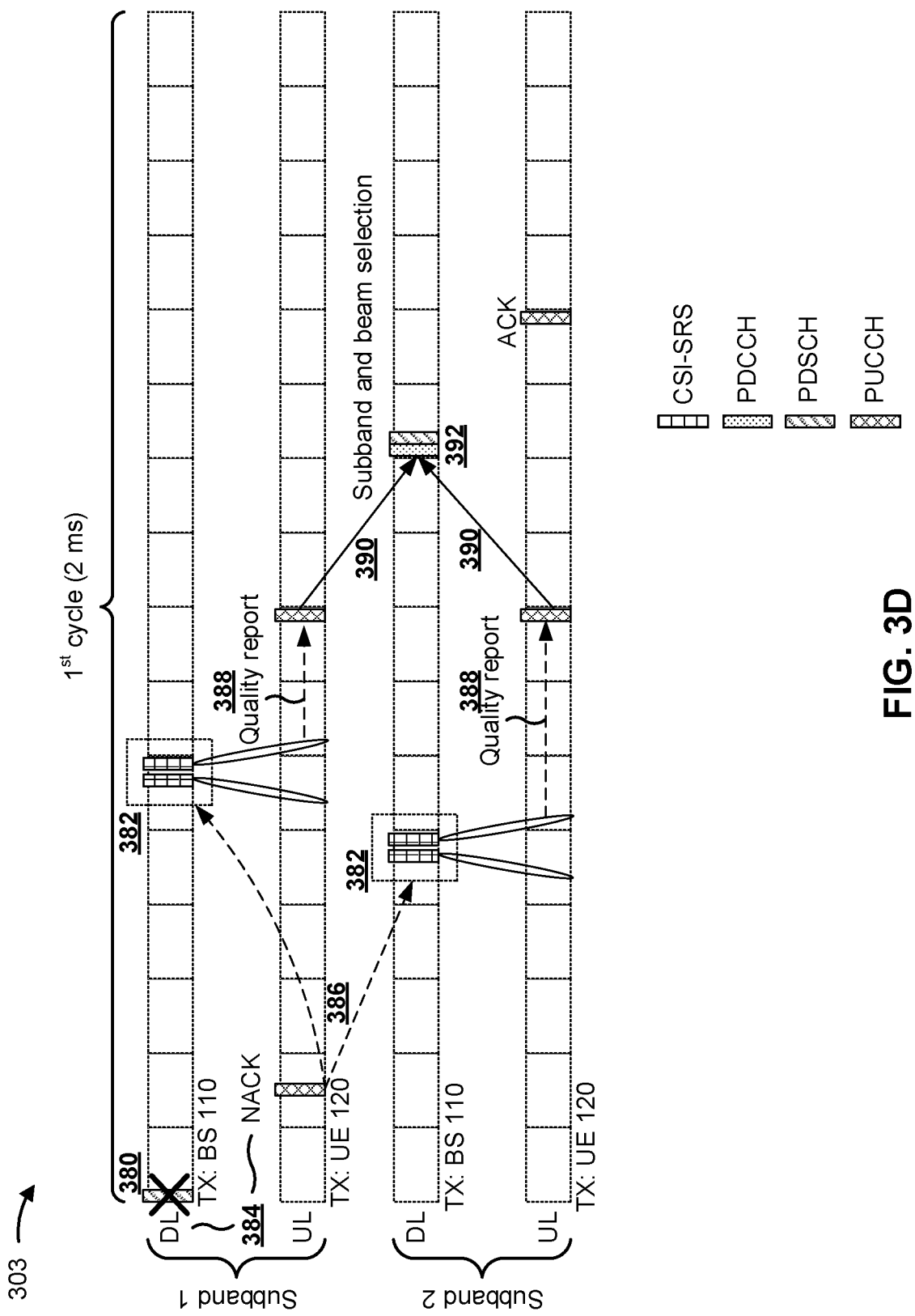

As shown in FIG. 3D, and in example 303, BS 110 may configure a resource 380 for a PDSCH on a first subband and a resource 382 for a reference signal transmission on the first subband and/or on a second subband. In this case, BS 110 may configure resource 382 for a channel state information (CSI-RS) transmission on the downlink rather than an SRS transmission on the uplink. As shown by reference number 384, BS 110 may transmit a PDSCH transmission and may receive, from UE 120, a NACK feedback message. In this case, based at least in part on receiving the NACK feedback message, BS 110 may determine that a retransmission event has occurred.

As further shown in FIG. 3D, and by reference number 386, based at least in part on determining that a retransmission event has occurred, BS 110 may use resource 322 to transmit a CSI-RS on the first subband, on the second subband, on the first subband and the second subband, and/or the like. As shown by reference number 388, based at least in part on transmitting the CSI-RS, BS 110 may receive a quality report from UE 120 (e.g., via a physical uplink control channel (PUCCH) transmission). In some aspects, BS 110 may preconfigure another resource for the PUCCH transmission to convey the quality report. In this case, when BS 110 does not detect a retransmission event, BS 110 may cancel activation of resource 382 for the CSI-RS transmission and/or the resource for the PUCCH transmission of the quality report to reduce a resource utilization and/or a level of interference. As shown by reference numbers 390 and 392, based at least in part on the quality report, BS 110 may select a subband and a beam, and may transmit a PDCCH and an associated retransmission of the PDSCH using the selected subband and beam.

As indicated above, FIGS. 3A-3D are provided as an example. Other examples may differ from what is described with respect to FIGS. 3A-3D.

Figure 4:
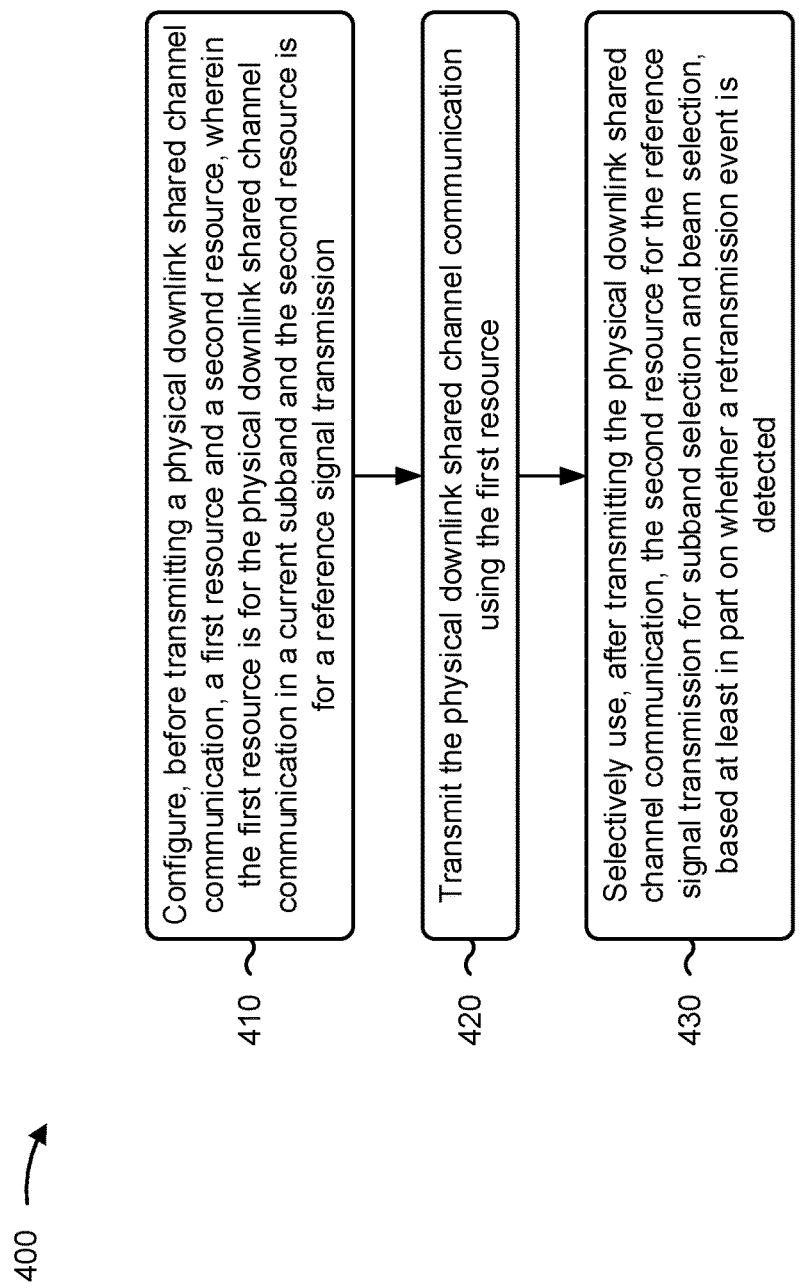
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where a BS (e.g., BS 110 and/or the like) performs operations associated with event triggered reference signal transmission.

As shown in FIG. 4, in some aspects, process 400 may include configuring, before transmitting a physical downlink shared channel communication, a first resource and a second resource, wherein the first resource is for the physical downlink shared channel communication in a current subband and the second resource is for a reference signal transmission (block 410). For example, the BS (e.g., using transmit processor 220, receive processor 238, controller/processor 240, memory 242, and/or the like) may configure, before transmitting a physical downlink shared channel communication, a first resource and a second resource, as described above in connection with FIGS. 3A-3D. In some aspects, the first resource is for the physical downlink shared channel communication in a current subband and the second resource is for a reference signal transmission.

In a first aspect, the second resource is in the current subband.

In a second aspect, alone or in combination with the first aspect, the second resource is in a different subband than the current subband.

In a third aspect, alone or in combination with one or more of the first and second aspects, the second resource is for a first reference signal transmission in the current subband and a second reference signal transmission in a different subband than the current subband.

In a fourth aspect, alone or in combination with one or more of the first through third aspects, a first time location in the current subband for the first reference signal transmission is offset from a second time location in the different subband for the second reference signal transmission.

In a fifth aspect, alone or in combination with one or more of the first through fourth aspects, the second resource is reserved at a time location offset from a time at which the retransmission event is to occur.

As further shown in FIG. 4, in some aspects, process 400 may include transmitting the physical downlink shared channel communication using the first resource (block 420). For example, the BS (e.g., using transmit processor 220, receive processor 238, controller/processor 240, memory 242, and/or the like) may transmit the physical downlink shared channel communication using the first resource, as described above in connection with FIGS. 3A-3D.

As further shown in FIG. 4, in some aspects, process 400 may include selectively using, after transmitting the physical downlink shared channel communication, the second resource for the reference signal transmission for subband selection and beam selection based at least in part on whether a retransmission event is detected (block 430). For example, the BS (e.g., using transmit processor 220, receive processor 238, controller/processor 240, memory 242, and/or the like) may selectively use, after transmitting the physical downlink shared channel communication, the second resource for the reference signal transmission for subband selection and beam selection based at least in part on whether a retransmission event is detected, as described above in connection with FIGS. 3A-3D.

In a sixth aspect, alone or in combination with one or more of the first through fifth aspects, the retransmission event is a receipt of a negative acknowledgement message on an uplink of a subband.

In a seventh aspect, alone or in combination with the first through sixth aspects, the second resource is activated based at least in part on the retransmission event being detected.

In an eighth aspect, alone or in combination with one or more of the first and seventh aspects, the second resource is cancelled based at least in part on the retransmission event not being detected.

In a ninth aspect, alone or in combination with one or more of the first through eighth aspects, the retransmission event relates to at least one of: a feedback message, a discontinuous transmission, a type of a received reference signal, or a content of a physical uplink control channel.

In a tenth aspect, alone or in combination with one or more of the first through ninth aspects, the retransmission event is a component carrier channel quality measurement that satisfies a measurement threshold.

In an eleventh aspect, alone or in combination with one or more of the first through tenth aspects, the component carrier channel quality measurement is at least one of: a signal to interference noise ratio measurement, a reference signal received power measurement, or a log-likelihood ratio measurement.

In a twelfth aspect, alone or in combination with one or more of the first through eleventh aspects, the reference signal transmission is a sounding reference signal transmission received from a user equipment, or a channel state information reference signal transmission transmitted to the user equipment.

In a thirteenth aspect, alone or in combination with one or more of the first through twelfth aspects, a third resource for an uplink quality report is configured before transmission of the physical downlink shared channel communication and activated based at least in part on whether the retransmission event is detected.

In a fourteenth aspect, alone or in combination with one or more of the first through thirteenth aspects, the third resource is cancelled based at least in part on the retransmission event not being detected.

Process 400 may include additional aspects, such as any single aspect or any combination of aspects described above and/or in connection with one or more other processes described elsewhere herein.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
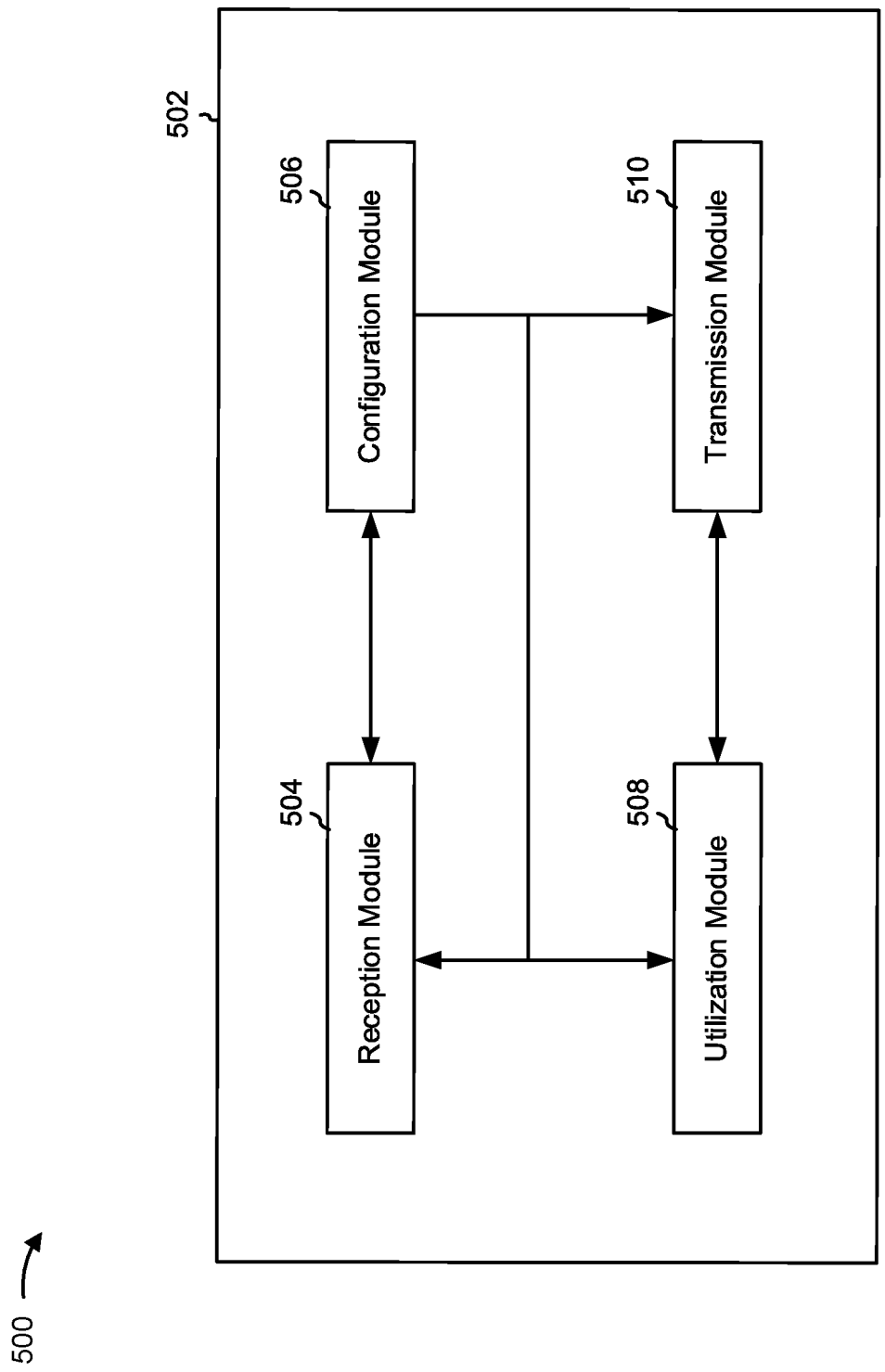
FIG. 5 is a conceptual data flow diagram illustrating an example of a data flow between different modules/means/components in an example apparatus.

FIG. 5 is a conceptual data flow diagram illustrating an example 500 of a data flow between different modules/means/components in an example apparatus 502. The apparatus 502 may include, for example, a BS (e.g., BS 110). In some aspects, the apparatus 502 includes a reception module 504, a configuration module 506, a utilization module 508, and a transmission module 510.

In some aspects, reception module 504 may receive transmissions that are transmitted to apparatus 502. For example, reception module 504 may receive a PUCCH conveying a NACK feedback message, an ACK feedback message, and/or the like, as described above in connection with FIGS. 3A-3D. Additionally, or alternatively, reception module 504 may receive a reference signal, such as a sounding reference signal as described above with regard to FIGS. 3A-3D.

In some aspects, configuration module 506 may configure resources. For example, configuration module 506 may configure resources for receiving reference signals, resources for transmitting reference signals, resources for receiving a quality report as a response to a reference signal, and/or the like, as described above with regard to FIGS. 3A-3D.

In some aspects, utilization module 508 may cause transmission module 510 and/or reception module 504 to use a reserved resource. For example, based at least in part on detecting a retransmission event, utilization module 508 may cause reception module 504 to receive a reference signal from a UE or cause transmission module 510 to transmit a reference signal to a UE, as described above with regard to FIGS. 3A and 3B.

In some aspects, apparatus 502 may include additional modules that perform each of the blocks of the algorithm in the aforementioned flow chart of FIG. 4. As such, each block in the aforementioned flow charts of FIG. 4 may be performed by a module, and apparatus 502 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
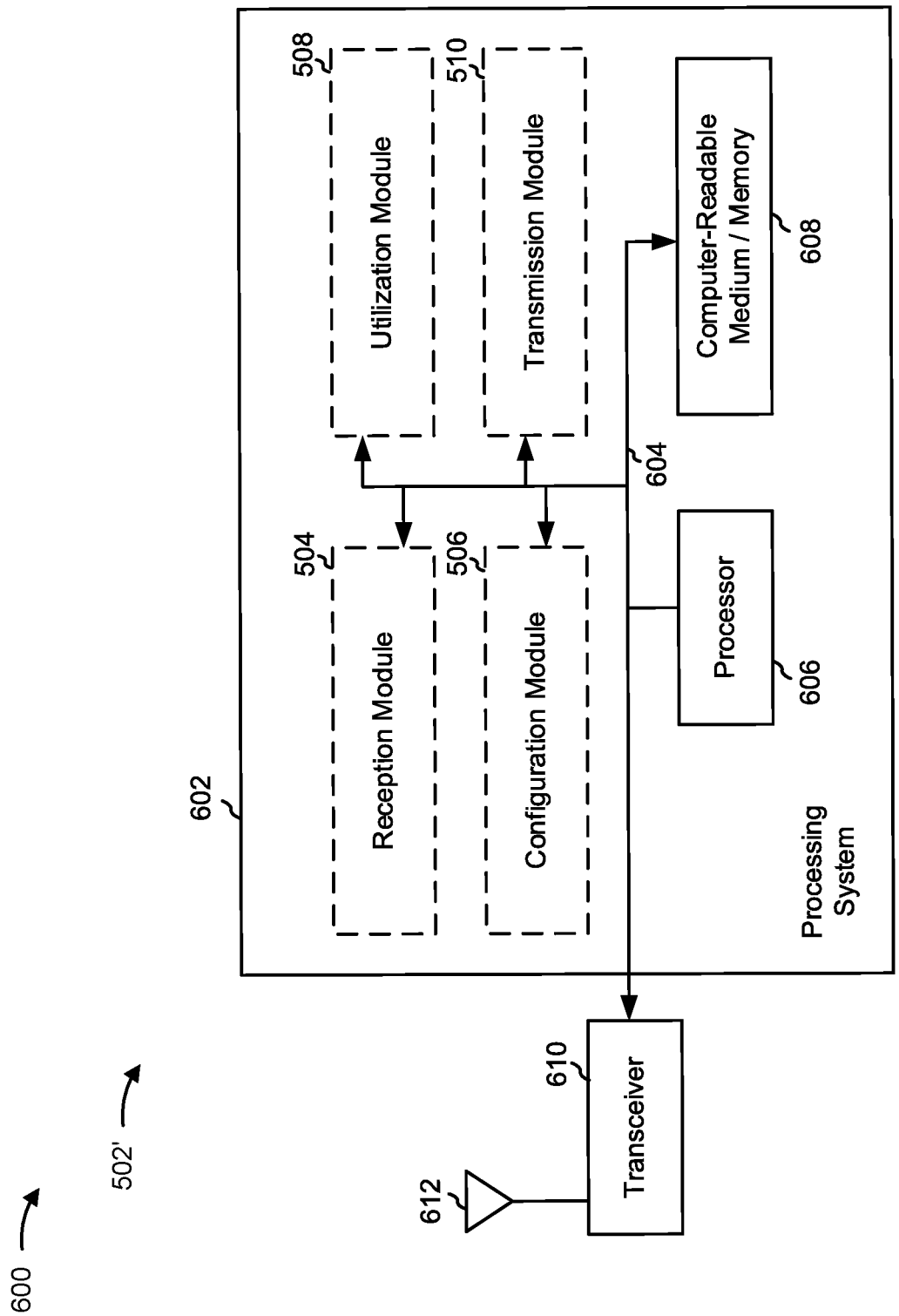
FIG. 6 is a diagram illustrating an example of a hardware implementation for an apparatus employing a processing system.

FIG. 6 is a diagram illustrating an example 600 of a hardware implementation for an apparatus (e.g., apparatus 502 described above in connection with FIG. 5) employing a processing system 602. The apparatus 502' may include, for example, a UE (e.g., UE 120).

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, and/or 510, and the computer-readable medium/memory 608. The bus 604 may also link various other circuits such as timing sources, peripherals, voltage regulators, and power management circuits, which are well known in the art, and therefore, will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602. In addition, the transceiver 610 receives information from the processing system 602 and based at least in part on the received information, generates a signal to be applied to the one or more antennas 612.

The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described above for any particular apparatus. The computer-readable medium/memory 608 may also be used for storing data that is manipulated by the processor 606 when executing software. The processing system further includes at least one of the modules 504, 506, 508, and/or 510. The modules may be software modules running in the processor 606, resident/stored in the computer readable medium/memory 608, one or more hardware modules coupled to the processor 606, or some combination thereof.

In some aspects, the apparatus 502 for wireless communication includes means for configuring, before transmitting a physical downlink shared channel communication, a first resource and a second resource, means for transmitting the physical downlink shared channel communication using the first resource, means for selectively using, after transmitting the physical downlink shared channel communication, the second resource for the reference signal transmission for subband selection and beam selection based at least in part on whether a retransmission event is detected, and/or the like. The aforementioned means may be one or more of the aforementioned modules of the apparatus 502 and/or the processing system 602 of the apparatus 502 configured to perform the functions recited by the aforementioned means.

As indicated above, FIG. 6 is provided as an example. Other examples may differ from what is described with regard to FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by network node, comprising:
configuring, before transmitting a physical downlink shared channel communication, a first resource of a current subband, a second resource of the current subband, and a third resource of a second subband,
wherein the first resource is for transmitting the physical downlink shared channel communication in a current subband, and
wherein the second resource is for receiving a first reference signal transmission in the current subband and the third resource is for receiving a second reference signal transmission in the second subband;
transmitting the physical downlink shared channel communication using the first resource; and
selectively using, after transmitting the physical downlink shared channel communication and based at least in part on whether a retransmission event is detected, the second resource of the current subband and the third resource of the second subband for:
receiving the first reference signal transmission on the current subband and the second reference signal transmission on the second subband, and
selecting a beam associated with the current subband or the second subband.

2. The method of claim 1, wherein the retransmission event is a receipt of a negative acknowledgement message on an uplink of the current subband.

3. The method of claim 1, wherein at least one of the second resource or the third resource is activated based at least in part on the retransmission event being detected.

4. The method of claim 1, wherein at least one of the second resource or the third resource is cancelled based at least in part on the retransmission event not being detected.

5. The method of claim 1, wherein a first time location in the current subband for the first reference signal transmission is offset from a second time location in the second subband for the second reference signal transmission.

6. The method of claim 1, wherein at least one of the second resource or the third resource is reserved at a time location offset from a time at which the retransmission event is to occur.

7. The method of claim 1, wherein the retransmission event relates to at least one of:
a feedback message,
a discontinuous transmission,
a type of a received reference signal, or
a content of a physical uplink control channel.

8. The method of claim 1, wherein the retransmission event is a component carrier channel quality measurement that satisfies a measurement threshold.

9. The method of claim 8, wherein the component carrier channel quality measurement is at least one of:
a signal to interference noise ratio measurement,
a reference signal received power measurement, or
a log-likelihood ratio measurement.

10. The method of claim 1, wherein each of the first reference signal transmission and the second reference signal transmission is a sounding reference signal transmission received from a user equipment or a channel state information reference signal transmission transmitted to the user equipment.

11. The method of claim 1, wherein a fourth resource for an uplink quality report is configured before transmission of the physical downlink shared channel communication and activated based at least in part on whether the retransmission event is detected.

12. The method of claim 11, wherein the fourth resource is cancelled based at least in part on the retransmission event not being detected.

13. A network node for wireless communication, comprising:
a memory; and
one or more processors coupled to the memory, the one or more processors configured to:
configure, before transmitting a physical downlink shared channel communication, a first resource of a current subband, a second resource of the current subband, and a third resource of a second subband,
wherein the first resource is for transmitting the physical downlink shared channel communication in a current subband, and
wherein the second resource is for receiving a first reference signal transmission in the current subband and the third resource is for receiving a second reference signal transmission in the second subband;
transmit the physical downlink shared channel communication using the first resource; and
selectively use, after transmitting the physical downlink shared channel communication and based at least in part on whether a retransmission event is detected, the second resource of the current subband or the third resource of the second subband for:
receiving, the first reference signal transmission on the current subband and the second reference signal transmission on the second subband, and
selecting a beam associated with the current subband or the second subband.

14. The network node of claim 13, wherein the retransmission event is a receipt of a negative acknowledgement message on an uplink of the current subband.

15. The network node of claim 13, wherein at least one of the second resource or the third resource is activated based at least in part on the retransmission event being detected.

16. The network node of claim 13, wherein at least one of the second resource or the third resource is cancelled based at least in part on the retransmission event not being detected.

17. The network node of claim 13, wherein a first time location in the current subband for the first reference signal transmission is offset from a second time location in the second subband for the second reference signal transmission.

18. The network node of claim 13, wherein at least one of the second resource or the third resource is reserved at a time location offset from a time at which the retransmission event is to occur.

19. The network node of claim 13, wherein the retransmission event relates to at least one of:
a feedback message,
a discontinuous transmission,
a type of a received reference signal, or
a content of a physical uplink control channel.

20. The network node of claim 13, wherein the retransmission event is a component carrier channel quality measurement that satisfies a measurement threshold.

21. The network node of claim 20, wherein the component carrier channel quality measurement is at least one of:
a signal to interference noise ratio measurement,
a reference signal received power measurement, or
a log-likelihood ratio measurement.

22. The network node of claim 13, wherein each of the first reference signal transmission and the second reference signal transmission is a sounding reference signal transmission received from a user equipment or a channel state information reference signal transmission transmitted to the user equipment.

23. The network node of claim 13, wherein a fourth resource for an uplink quality report is configured before transmission of the physical downlink shared channel communication and activated based at least in part on whether the retransmission event is detected.

24. The network node of claim 23, wherein the fourth resource is cancelled based at least in part on the retransmission event not being detected.

25. A non-transitory computer-readable medium storing a set of instructions for wireless communication, the set of instructions comprising:
one or more instructions that, when executed by one or more processors of a network node, cause the network node to:
configure, before transmitting a physical downlink shared channel communication, a first resource of a current subband, a second resource of the current subband, and a third resource of a second subband,
wherein the first resource is for transmitting the physical downlink shared channel communication in a current subband, and
wherein the second resource is for receiving for a first reference signal transmission in the current subband and the third resource is for receiving a second reference signal transmission in the second subband;
transmit the physical downlink shared channel communication using the first resource; and
selectively use, after transmitting the physical downlink shared channel communication and based at least in part on whether a retransmission event is detected, the second resource of the current subband and the third resource of the second subband for:
receiving, for first the reference signal transmission on current subband and the second reference signal transmission on the second subband, and
selecting a beam associated with the current subband or the second subband.

26. The non-transitory computer-readable medium of claim 25, wherein at least one of the second resource or the third resource is activated based at least in part on the retransmission event being detected.

27. The non-transitory computer-readable medium of claim 25, wherein at least one of the second resource or the third resource is cancelled based at least in part on the retransmission event not being detected.

28. An apparatus for wireless communication, comprising:
means for configuring, before transmitting a physical downlink shared channel communication, a first resource of a current subband, a second resource of the current subband, a third resource of a second subband,
wherein the first resource is for transmitting the physical downlink shared channel communication in a current subband, and
wherein the second resource is for receiving a first reference signal transmission in the current subband and the third resource is for receiving a second reference signal transmission in the second subband;
means for transmitting the physical downlink shared channel communication using the first resource; and
means for selectively using, after transmitting the physical downlink shared channel communication and based at least in part on whether a retransmission event is detected, the second resource of the current subband and the third resource of the second subband for:
receiving, the first reference signal transmission on current subband and the second reference signal transmission the second subband, and
selecting a beam associated with the current subband or the second subband.

29. The apparatus of claim 28, wherein at least one of the second resource or the third resource is activated based at least in part on the retransmission event being detected.

30. The apparatus of claim 28, wherein at least one of the second resource or the third resource is cancelled based at least in part on the retransmission event not being detected.

* * * * *